United States Patent

Frade et al.

[11] 4,122,509
[45] Oct. 24, 1978

[54] SOLID ELECTROLYTE TANTALUM CAPACITORS

[75] Inventors: Gilbert Frade; Balint Escher; Dominique Prince, all of Paris, France

[73] Assignee: Lignes Telegraphiques et Telephoniques, Paris, France

[21] Appl. No.: 747,905

[22] Filed: Dec. 6, 1976

[30] Foreign Application Priority Data

Dec. 12, 1975 [FR] France .................. 75 38035

[51] Int. Cl.² ........................................... H01G 9/00
[52] U.S. Cl. ...................................... 361/433; 29/570
[58] Field of Search ................... 361/433; 29/570

[56] References Cited

U.S. PATENT DOCUMENTS

| | | | |
|---|---|---|---|
| 3,495,311 | 2/1970 | Harkness | 357/14 |
| 3,984,208 | 10/1976 | Moulin et al. | 361/433 |

*Primary Examiner*—Stanley D. Miller, Jr.
*Assistant Examiner*—James W. Davie
*Attorney, Agent, or Firm*—Carroll F. Palmer

[57] ABSTRACT

In solid electrolytic tantalum capacitors, the dielectric consisting mainly of tantalum pentoxide contains two different ionized additions the valences of which are respectively higher and lower than 5.

8 Claims, 5 Drawing Figures

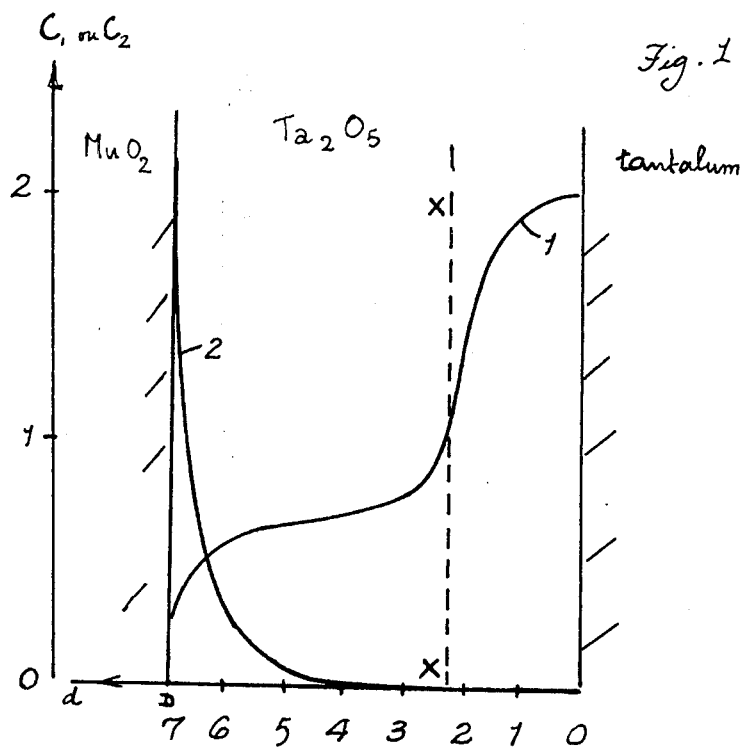
Fig. 1
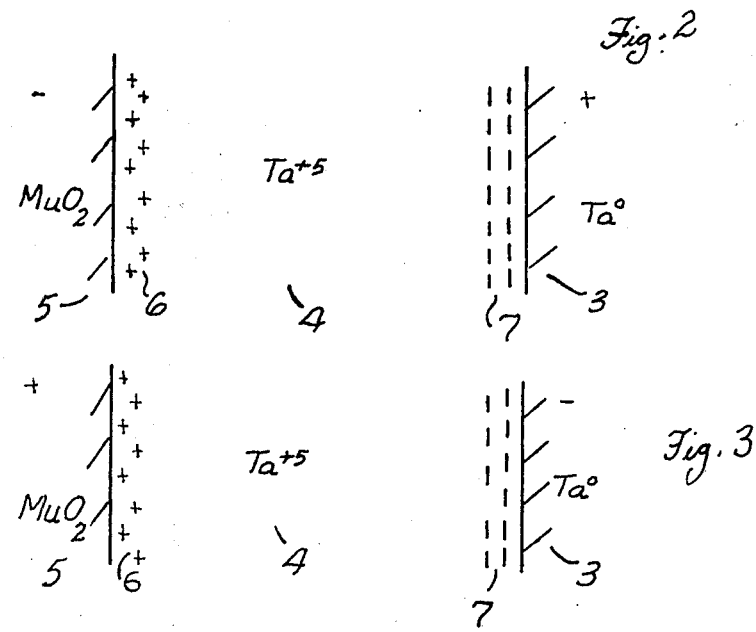
Fig. 2
Fig. 3

SOLID ELECTROLYTE TANTALUM CAPACITORS

BACKGROUND OF THE INVENTION AND PRIOR ART

The present invention concerns solid electrolyte capacitors and more particularly those having impurities for improving the performances of tantalum capacitors forming the subject of U.S. Pat. No. 3,166,693 applied for Apr. 2nd, 1953, by Bell Telephone Laboratories.

The commercial interest afforded by this electronic component has not fallen short of expectations since it was invented. The users' requirements have constantly increased and manufacturers have made efforts to improve the products offered. For their part, the Assignees have proposed in U.S. Pat. No. 3,867,129 filed on Feb. 5th, 1974, for: "Anodically oxidizable Metal Powder" and in the U.S. Application Ser. No. 665,287 filed on Mar. 9th, 1976, for: "Production of improved anodes for solid electrolyte capacitors", as well as in the U.S. application Ser. No. 727,429 filed on Sept. 28th, 1976, for: "Solid electrolytic capacitor", solid electrolytic tantalum capacitors containing a single, appropriately chosen impurity in a proportion of between 100 and 20,000 parts per million so as to improve one of the electrical characteristics of the capacitors, the other production steps being carried on according to the prior art.

The present invention has for its object to increase the robustness of tantalum electrolytic capacitors so as to enable them to withstand repeated pulsed discharges.

BRIEF SUMMARY OF THE INVENTION

The solid electrolyte capacitor made of a sintered tantalum anode, a dielectric consisting of a layer of tantalum oxide of a thickness D obtained by anodic oxidation of the tantalum anode and a cathode comprising manganese dioxide and conductive layers completing the cathode according to the invention is characterized in that the layer of tantalum oxide contains a first impurity consisting of an hexavalent metallic ion whose concentration $C_1$ varies as a function of the distance $d$ from the tantalum anode, from a maximum value when $d$ has a zero value to a minimum value when $d$ reaches the value D, and a second impurity consisting of an ion whose valence is at most equal to four and whose concentration $C_2$ tends towards zero when $d$ takes a zero value and increases monotonously with $d$.

In accordance with a first feature of the invention, the hexavalent ion which has a large ionic diameter and a low mobility in the electrolyte is formed during the anodic oxidation from the corresponding metal introduced in the anode at the latest during sintering while the trivalent ion which has a smaller ionic diameter and a higher mobility is directly introduced as an ion at the earliest during anodic oxidation.

In accordance with another feature of the invention, the hexavalent ion may be that of molybdenum, that of tungsten, that of chromium, that of hafnium or that of zirconium, and the ion having a valence at most equal to four may be, if it is trivalent, that of boron or that of aluminum and, if it is tetravalent, that of silicon, that of titanium, that of germanium or that of zirconium.

In accordance with a preferred embodiment of the invention, the hexavalent ion is that of molybdenum with a concentration between 100 and 20,000 ppm and the trivalent ion is that of boron with a concentration between 0.001 and 20,000 ppm.

The capacitor according to the preferred variant of the invention has the following advantages over a capacitor whose dielectric contains only boron (as described in the above copending application):

the reverse leakage current has decreased, as well as the spreading of the values of the forward leakage current.

The capacitor according to the invention also has the following advantages over a capacitor whose dielectric contains only molybdenum:

the reverse leakage current has decreased and above all the forward leakage current has decreased.

BRIEF DESCRIPTION OF THE DRAWINGS

Further features and advantages of the capacitors according to the invention will become apparent in the course of the following description with reference to the accompanying FIGS. 1 to 5, which are given only by way of illustration in which:

FIG. 1 illustrates the distribution of the concentrations $C_1$ and $C_2$ in the dielectric layer;

FIGS. 2 and 3 show a diagram of the dielectric of the capacitor according to the invention when it is subjected to a forward voltage and to a reverse voltage respectively;

DETAILED DISCLOSURE OF THE INVENTION

Figure 4:
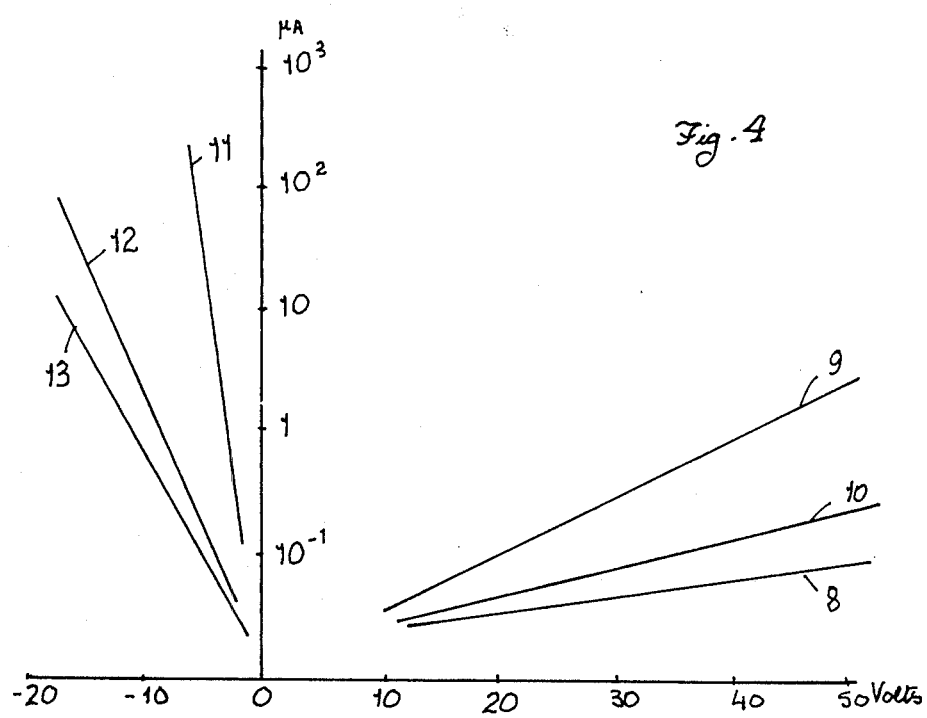
FIG. 4 illustrates the variation of the forward and reverse leakage currents of a capacitor according to the invention as a function of voltage.

FIG. 1 shows the curves of the variation of the concentration of the ions introduced as impurity into the tantalum oxide layer of a capacitor according to the invention. Curve 1 relates to a first hexavalent ion and curve 2 to a second ion having a valence of at most four.

A chain line X—X has been traced at the place where the tantalum limit was situated before oxidation into the dielectric $Ta_2O_5$. In the course of the oxidation, the limit X—X of the metallic tantalum has shifted by about one-third of the actual thickness of the dielectric towards the metal. The maximum hexavalent ion concentration close to the tantalum serving as the anode, on the other hand, is minimum on the $MnO_2$ side. Since the radius of the hexavalent ion is large compared to that of tantalum, it is difficult to introduce it electrochemically into the layer of oxide $Ta_2O_5$. On the other hand, there are a number of methods for introducing a metal into the surface layer of the tantalum just before anodic oxidation. The latter, which is carried out by electrochemical means, results in a variation of hexavalent ion concentration $C_1$ during the growing of the layer of oxide $Ta_2O_5$. Since the diameter of the second additional ion is smaller, it is introduced electrochemically, its concentration $C_2$ varying monotonously from a maximum value $C_{2D}$ when $d = D$ to a minimum value of less than $C_{2D}/100$ when $d = 0$, passing through the value $C_{2D}/50$ when $d$ is substantially equal to $D2/3$.

An attempt may be made to explain the behaviour of the capacitor according to the invention with reference to FIGS. 2 and 3.

FIG. 2 illustrates the dielectric 3 separating the metallic tantalum 4 brought to a positive potential in relation to the solid electrolyte 5 which is at the electrical potential of the cathode. The second additional ion having a valence at most equal to four replaces the tantalum in the oxide, which results in a hole and build up of a fixed positive charge. Consequently, a positive potential barrier is located in the zone of the maximum concentration of this ion. Likewise, the hexavalent ions replace $Ta^{+5}$ ions and bring one electron in excess for each $Ta^{+5}$ ion which is replaced. This results in a negative fixed potential barrier 7. Let it be assumed for the sake of clarity and by way of illustration having no limiting character that the first ion is a molybdenum ion and the second is a boron ion. When a forward voltage (tantalum positive and manganese dioxide negative) is applied to such a capacitor, the addition of a positive field due to the boron limits the effect of the negative field due to the molybdenum. The leakage current of the capacitor according to the invention is lower than that of the capacitor whose dielectric contains only molybdenum, while it shows higher breakdown strength. In the case of overvoltage or surge, a certain electronic flow remains possible through the capacitor. If a reverse voltage is applied (tantalum negative and manganese dioxide positive), the presence of the negative field due to the molybdenum atoms close to the tantalum results in a potential barrier as in the case of capacitors doped with a single type of ions. A capacitor according to the invention has good behaviour under reverse voltage and low leakage current. In the case of an excessively high negative surge, or a local defect in the capacitor, the positive potential barrier due to the boron performs, on the contrary, the function of an electron acceptor and favors the flow of the electrons. Under inverse voltage, this prevents untimely breakdown and explains the greater strength of the capacitors according to the invention. Generally speaking, the presence of the two types of ions, the first being hexavalent and the second at most tetravalent, distributed through the dielectric as stated in the foregoing, imparts to the capacitor according to the invention the forward voltage strength of the capacitor doped with a single type of ions, either trivalent or tetravalent, and under reverse voltage the strength of the capacitor doped only with hexavalent ions.

FIG. 4 shows experimental curves representing the variation of the leakage current of solid electrolyte capacitors as a function of the applied voltage, plotted positively when forward bias is used (tantalum electrode positive) and negatively when reverse bias is used (tantalum electrode negative).

Curves 9 and 12 relate to a capacitor whose dielectric contains only one hexavalent ion which is, by way of example a molybdenum ion. Curves 8 and 11 relate to a second capacitor whose dielectric again has only one acceptor ion which, by way of example, is boron. Curves 8, 9, 11 and 12 are those shown in FIG. 4 of the U.S. application Ser. No. 727,429 filed on Sept. 28th, 1976, by the applicants, mentioned in the foregoing. Curves 10 and 13 concern a capacitor according to the invention whose dielectric contains a first hexavalent ion and a second ion whose valence is at most equal to four. By way of example having no limiting character, the first ion is the hexavalent molybdenum ion and the second ion is the trivalent boron ion.

Curve 10 shows that the leakage current of the capacitor according to the invention in the forward direction is lower than that of the capacitor whose dielectric contains only molybdenum and approaches that of the capacitor whose dielectric contains only boron. Curve 13 shows that the reverse leakage current of the capacitor according to the invention is not only lower than that of the capacitor whose dielectric contains only boron, which is a foreseeable result in the light of the discussion given with reference to FIG. 3, but in addition lower than that of the capacitor whose dielectric contains only molybdenum.

Figure 5:
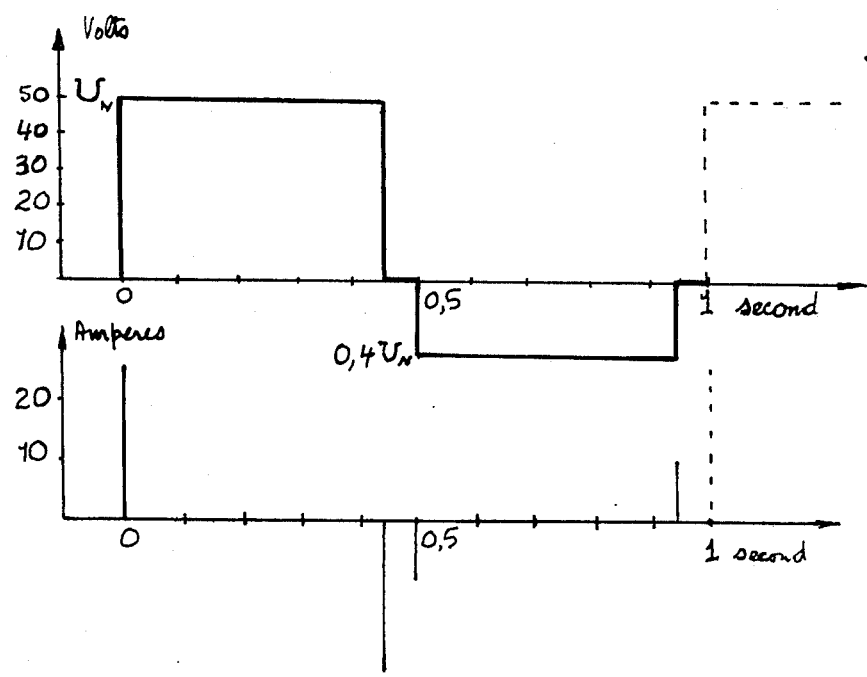
FIG. 5 illustrates the form of the pulses applied to a capacitor according to the invention in the course of a life test.

The use of the capacitor under repeated pulse stress is demonstrated by a life test carried out at 85° C, for example by applying a voltage $U_n$ (rated operating voltage of the capacitor under test) equal to 50 volts to a capacitor according to the invention having a capacitance of 22 microfarads. These pulses represented in FIG. 5 have a duration equal to 450 milliseconds. During the leading edges, the current reaches 25 amperes. The pulse is followed by an interval of time equal to 50 milliseconds, during which the voltage is zero, and then by an inversion of the voltage of a duration equal to 450 milliseconds, whose amplitude reaches 40% of the value of $U_n$, i.e. 20 volts. The repetition period of the test cycle is equal to one second. A capacitor according to the invention withstands at least 10,000 cycles as just described before being out of service. Under the same conditions, a control capacitor having no additive withstands at most 500 cycles.

Capacitors according to the invention can be manufactured in various ways, all of which are equivalent to one another, provided that at least the following requirements are satisfied :

dispersion of the metal for the hexavalent ion in the tantalum is achieved before the tantalum oxide layer is applied;

introduction of a second ion having a valence lower than four is achieved during the electrochemical oxidation of the tantalum.

As has been shown by the experiment carried out in the case of molybdenum, the dispersion of the metal corresponding to the hexavalent ion may be effected by mixing pure tantalum powder with pure molybdenum powder and treating the new powder obtained by the process employed for the manufacture of capacitors according to the prior art. The pure tantalum powder may also be dipped into a solution of a molybdenum salt, and a sintered anode may then be prepared by the process prior to the invention, or again molybdenum may be dispersed by decomposing one of the molybdenum carbonyls at 150° C on tantalum powder, or a presintered anode may be dipped into a solution containing a molybdenum salt or molybdenum may be deposited by electrolysis in sulphuric acid or acetic acid medium on a presintered tantalum anode. It will be obvious that some of these methods are also applicable to hexavalent metals other than molybdenum, such as tungsten, chromium, hafnium and zirconium.

What we claim is :

1. In a solid electrolyte capacitor comprising a sintered tantalum anode, a dielectric consisting of a tantalum oxide layer of a thickness D obtained by anodic oxidation of said tantalum anode and a cathode comprising manganese dioxide and a conductive layer, the improvement which comprises having said layer of tantalum oxide contain a first impurity consisting of a hexavalent metallic ion whose concentration $C_1$ varies as a function of the distance $d$ from said tantalum anode, from a maximum value when d is zero to a minimum value when $d$ equals D, and a second impurity selected from the group consisting of trivalent ions and tetravalent ions whose concentration $C_2$ tends towards zero when $d$ is zero and increases monotonically with $d$.

2. A solid electrolyte capacitor according to claim 1 wherein said first impurity is an ion selected from the group consisting of molybdenum, tungsten, chromium, hafnium and zirconium ions and said second impurity is an ion selected from the group consisting of boron, aluminum, silicon, titanium, germanium and zirconium ions.

3. A solid electrolyte capacitor according to claim 2 wherein said concentration $C_2$ varies from a maximum value X when $d$ equals D to a minimum value lower than X/100 when $d$ equals zero, passing through the value X/50 when $d$ is substantially equal to 2D/3.

4. A solid electrolyte capacitor according to claim 1 wherein said first impurity is introduced in dispersed form in the tantalum of said anode before the course of sintering said anode and said second impurity is directly introduced in ionic form into said layer of tantalum oxide during said anodic oxidation.

5. A solid electrolyte capacitor according to claim 4 wherein the metal corresponding to the said hexavalent ion is introduced as a metal powder into the tantalum powder used for the production of the anodes.

6. A solid electrolyte capacitor according to claim 4 wherein the said metal corresponding to the hexavalent ion is deposited on the surface of the grains constituting the pure tantalum powder, by decomposition of metal carbonyl under the action of heat.

7. A solid electrolyte capacitor according to claim 4 wherein the tantalum anode is presintered and then dipped into a solution of a salt of the metal corresponding to the hexavalent ion, and thereafter finally sintered whereby said salt decomposes in the course of the sintering.

8. A solid electrolyte capacitor according to claim 7 wherein the presintered tantalum anode is covered by a small quantity of the metal corresponding to the hexavalent ion by electrolysis in acid medium, and thereafter completely sintered.

* * * * *